Dec. 9, 1930. M. SWENSON, JR 1,784,320
LAMP FOR MOTOR AND THE LIKE VEHICLES
Filed Dec. 17, 1928

INVENTOR
MARTIN SWENSON JNR.,
BY [signature] ATTY.

Patented Dec. 9, 1930

1,784,320

UNITED STATES PATENT OFFICE

MARTIN SWENSON, JR., OF TAIHAPE, NEW ZEALAND

LAMP FOR MOTOR AND LIKE VEHICLES

Application filed December 17, 1928. Serial No. 326,641.

This invention relates to the lamps of motor and the like vehicles.

At the present time drivers of motor and the like vehicles have to contend with the dazzling glare of headlights of an approaching car, and even if said headlights are dimmed or extinguished, this action often causes an inability to see the vehicle which one has to pass.

It is the object of this invention to provide apparatus to overcome the danger and difficulties attendant upon motor vehicles passing each other at night.

A further object of the invention is to provide means whereby after the headlights of the motor vehicle to which this invention is attached have been dimmed or extinguished, an auxiliary light is caused to function and direct its beams over the front of the hood and also far enough forward to allow the light to be spread down on the top of the bonnet of the motor vehicle, and at the same time also to show a downward beam of light on the road well in front of the said vehicle.

With these objects in view the invention consists of a hollow "casing" member of any desired size, formed with a front, a top, two sides and a rear portion. The member may be made of any light metal or of earthenware or glass, and when made from metal the member may be blocked and shaped from the sheet so that a concave surface is produced.

The said member is characterized by having one of its sides cut away and therefore of a shorter depth than the other side, and the rear portion of the casing member is prolonged further than the front portion, and the inside surface of said downward portion is brightened or treated with a suitable solution to act as a reflector.

Means are provided in the said casing member for retaining an electric bulb having the necessary connection therefrom to the light supply of the motor vehicle, and there is a glass cover provided of similar shape but smaller than the main member, which glass cover is adapted to be placed and retained within said main member.

A metal rod attached to or forming part of the said casing member is provided and together with a clamp member forms means for adjustably attaching the invention in a desired position on the driver's side of the motor vehicle.

A suitable two way switch is provided and connected to the power wiring for the headlights and the auxiliary light in the said casing member, and on movement being given to the said switch, power to the said headlights is disconnected and they are extinguished, and simultaneously power is transmitted to the auxiliary light in the casing member, and when the switch is again moved power is disconnected from the auxiliary light in the casing member, and automatically connected to the headlights of the vehicle.

Referring to the drawings accompanying this specification,

Figure 1:
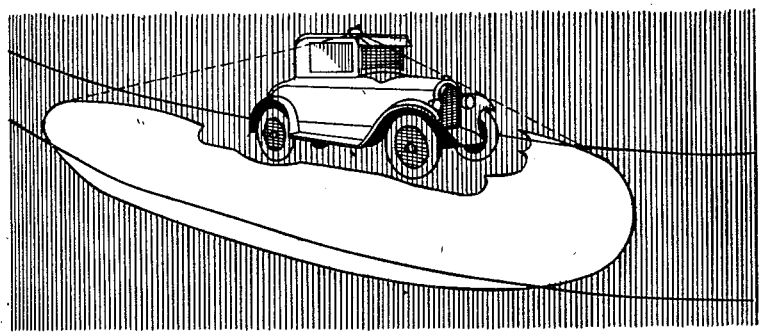
Figure 1 is a perspective view of a motor car fitted with my invention and illustrates the lighting effect thereof after the headlamps have been extinguished.

Referring to the drawings and describing now the casing member, this is preferably shaped as illustrated and comprises a front 1, top 2, sides 3 and 3A, and a rear portion 4.

In manufacture the corners of the said member are rounded, and one of the sides 3A is of a shorter downward length than its opposing side member. The object of this construction will be hereinafter described.

As before mentioned, the rear portion 4 of the casing member is of greater length, than the front portion 1, and the inside face 5 of said downward portion 4 is brightened or treated with a suitable solution to act as a reflector.

A glass cover 6 is provided, and is of similar shape to the casing member, but is slightly smaller than the external diameter thereof, so as to permit the said glass cover 6 to fit within the said casing member, and be retained therein by a groove 7 formed on the inside of the said casing member, or retention may be obtained by spring clip members (not shown) fitted within the aforesaid groove 7.

Figure 4:
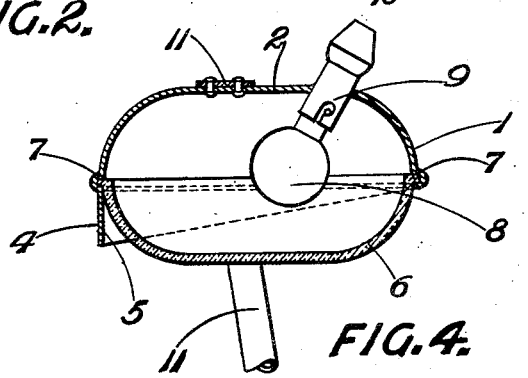
Figure 4 is a sectional elevation of the invention.

An electric bulb 8 is provided to give the necessary light, and is retained by the known type of fitting 9 positioned in the casing member preferably as illustrated in Figure 4 of the accompanying drawings, near to the front 1 of the casing member and with the said bulb 8 in a leaning position rearwards so that the rays of light from the said lamp will strike the reflecting surface 5 of the rear portion 4 and be directed downwardly and forwardly of the motor vehicle.

The necessary wiring connection 10 for supplying power to the lamp is provided and may be led therefrom to the power source.

As it is most important that the invention be attached to the motor vehicle in a correct position, I provide attachment means therefore comprising a metal rod 11, this is attached to or forms part of the casing member, and the construction is illustrated in the drawings.

It may be desired to convey the electric light wire for the lamp 8 through said rod 11, in which case same would be made hollow as illustrated.

Figure 2:
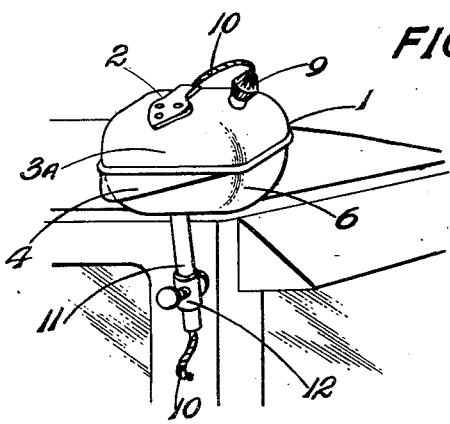
Figure 2 is a side view of the invention in position on a motor car.
Figure 3:
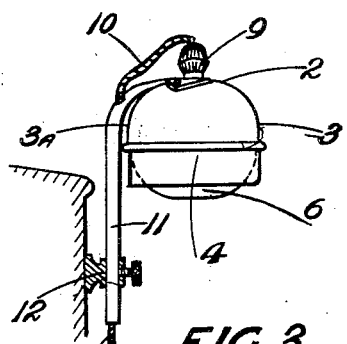
Figure 3 is an end elevation of Figure 2.

To retain said rod 11 in the position desired, an adjustable clamp 12 is provided and positioned preferably on the windscreen post of the motor vehicle, though I do not desire to liimt myself to such position, as this is a matter for the owner of the vehicle. As will be seen from the drawings (Figures 2 and 3) the clamp 12 will permit a sliding adjustment of the rod 11 and such clamp may be capable of allowing a tilting movement being given to the whole casing member.

It is essential that the electric bulb 8 should be of a strong candle power to give the best lighting effect. As before stated one of the sides 3A of the casing member is shorter than its opposing member and as the said short side faces the motor vehicle light from the bulb 8 is permitted to be directed sideways over the said vehicle rendering same clearly visible to the driver of an oncoming car.

In conjunction with the invention I employ the usual known type of two way switch (not shown) said switch is preferably positioned on the steering column of the motor vehicle, and the wiring leads for the motor vehicle's headlights and the auxiliary light are attached to said switch and the power supply. The lighting of either of said lamps i. e. the headlamps or auxiliary lamp is effected by moving the switch to whatever contact position is desired. For instance, if the auxiliary light is desired, the switch is moved to its contact and this action disconnects the power to the headlights for the time being, and when a vehicle has passed, the switch is moved back to the headlights contact which are then lit, and the auxiliary light is extinguished.

It is believed from the aforesaid description that the advantages of using my invention will be apparent, as the driver of a motor vehicle to which my invention is fitted will dim or extinguish his headlights on seeing an approaching vehicle, and switch on the auxiliary light positioned as before described. By this action he will throw a good light over his vehicle, forwardly and rearwardly, and sidewards thereof, so that his vehicle becomes distinctively outlined to the driver of the approaching vehicle, as the glare of the headlights from the first mentioned vehicle have been extinguished obviating any danger or inability to see the said vehicle.

Having thus described my invention, what I claim as new and desire to secure by Letters Patent is:—

1. A lamp of the class described comprising an elongated dome-shaped casing formed with a bead having a depression on the inside thereof and a depending portion below the bead, the depending portion inclining from the rear toward the front of the casing and merging into the bead, an elongated inverted dome-shaped globe formed with a bead to engage in the depression in the bead on the casing, the rear depending portion and the inclined side wall thereof on the casing being spaced from the curved rear and side walls of the inverted globe to form reflecting surfaces, and a lamp bulb supported between the casing and globe.

2. A lamp of the class described comprising a top bowl-shape dome section formed at the rear and sides with a vertical depending portion, the base of said section being substantially rectangular, the depending vertical side portions being cut at angle toward the rear vertical depending portion to provide a rear reflector, a lower bowl-shape globe section, the upper part of which is substantially rectangular and is fitted against the rectangular edge of the upper dome-shape section, the rear wall of the lower globe shape section being spaced from the vertically disposed rear portion of the upper bowl shape section, and a lamp bulb mounted in the space formed by the upper bowl-shape section and the lower globe shape section.

In testimony whereof I affix my signature.

MARTIN SWENSON, Jnr.